United States Patent [19]

Steinmüller

[11] 3,872,843

[45] Mar. 25, 1975

[54] EXHAUST GAS CHANNEL SYSTEM

[75] Inventor: Hans-Jochem Steinmüller, Wernau, Germany

[73] Assignee: Diamler-Benz Aktiengesellschaft, Stuttgart, Germany

[22] Filed: Mar. 22, 1974

[21] Appl. No.: 453,809

[30] Foreign Application Priority Data
Mar. 24, 1973 Germany............................ 2314771

[52] U.S. Cl. ................ 123/52 MV, 60/282, 60/302
[51] Int. Cl. .......................................... F02b 75/22
[58] Field of Search..... 123/52 MV, 188 M, 191 M; 60/272, 203

[56] References Cited
UNITED STATES PATENTS

| | | | |
|---|---|---|---|
| 3,274,981 | 9/1966 | Peras............................ | 123/188 M |
| 3,412,552 | 11/1968 | Elsbett.......................... | 123/188 M |
| 3,729,937 | 5/1973 | Haddad......................... | 60/272 |
| 3,744,463 | 7/1973 | McFarland.................... | 123/52 MV |
| 3,783,843 | 1/1974 | McFarland.................... | 123/52 MV |

Primary Examiner—Manuel A. Antonakas
Assistant Examiner—James W. Cranson, Jr.
Attorney, Agent, or Firm—Craig & Antonelli

[57] ABSTRACT

An exhaust channel system and exhaust gas decontamination installation which are arranged, respectively, in the cylinder head of an internal combustion engine, for example, of a V-shaped reciprocating piston engine, and in the housing of a catalyst or reactor which is arranged at least on one side of the internal combustion engine in close proximity to the cylinder head essentially parallel to the engine axis; the exhaust channel adjoining the exhaust valve is thereby constructed S-shaped in the cylinder head and its orifice lies in the working surface of the cylinder head which is constructed flange-like about the orifice and serves for the mounting of an elbow flange which is adjoined by the associated exhaust elbow which at first extends in the direction of the axis passing through the orifice and then outwardly and downwardly so that the housing of the decontamination installation is able to adjoin the same in a position in which it extends along the entire engine side.

9 Claims, 2 Drawing Figures

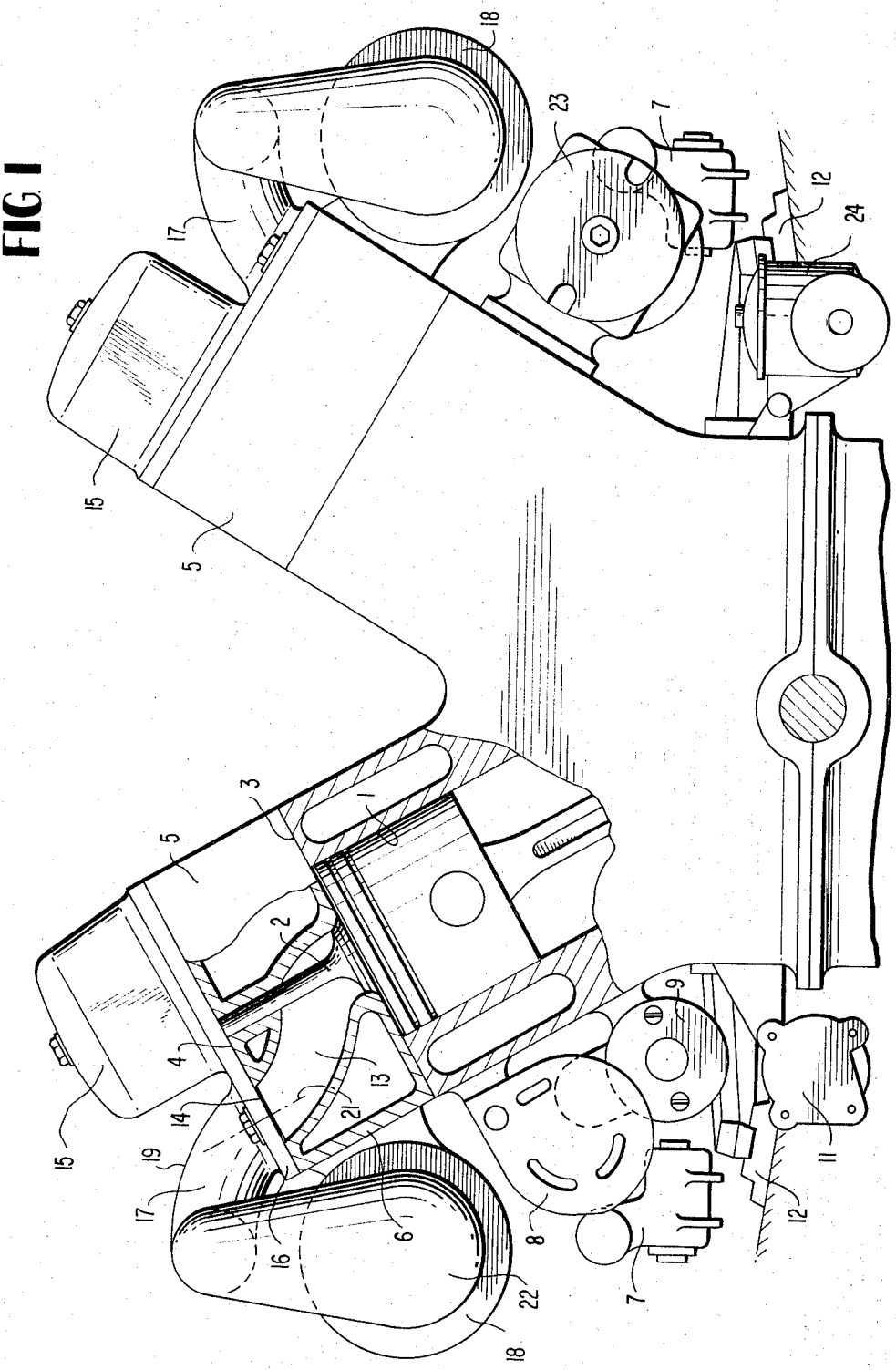

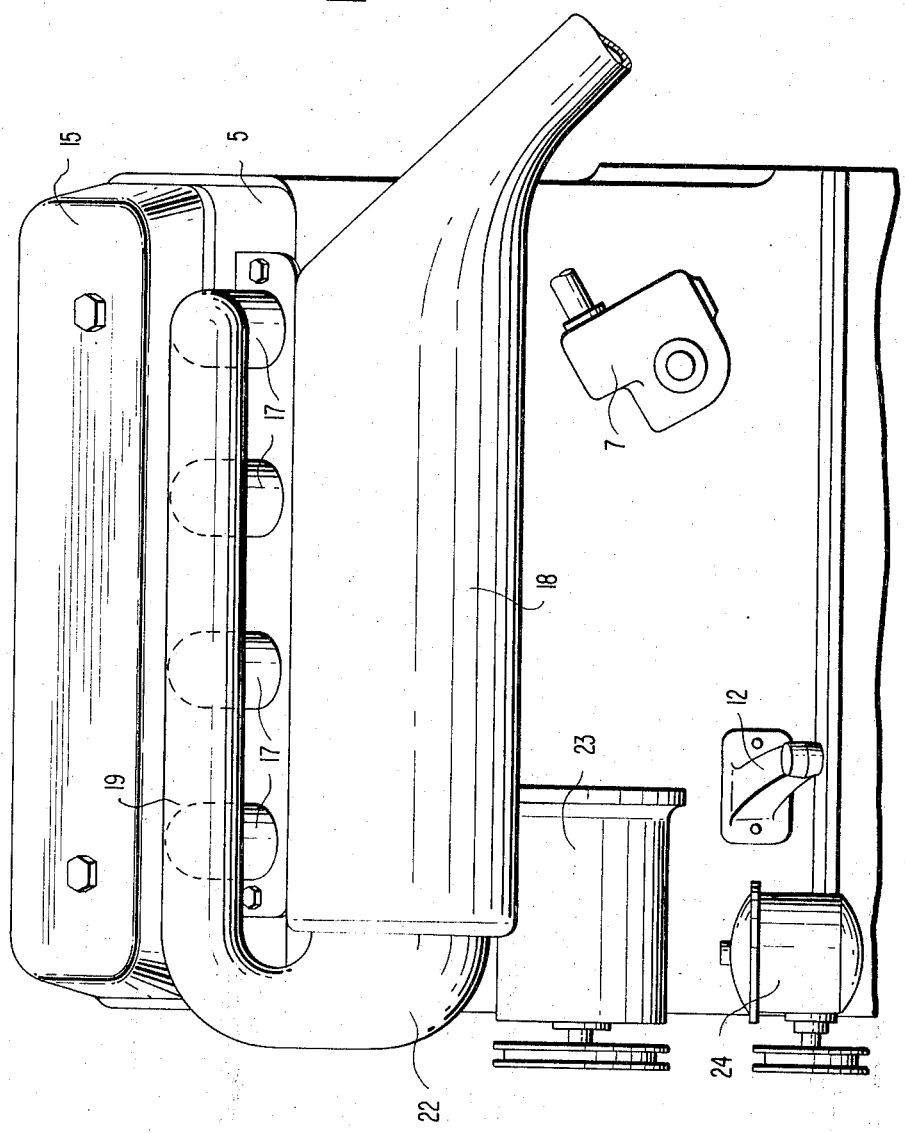

EXHAUST GAS CHANNEL SYSTEM

The present invention relates to an exhaust channel and an exhaust gas decontamination installation which are arranged in the cylinder head of an internal combustion engine, preferably of a V-shaped reciprocating piston engine, and in the housing of a catalyst or reactor which is arranged at least on one side of the internal combustion engine in direct proximity of the cylinder head and parallel to the engine axis.

An installation for the purification or decontamination of the exhaust gases of internal combustion engines can develop its effectiveness to a sufficient extent only if it has a sufficient structural length (volume) and nonetheless is mounted in proximity of the engine. Additionally, it should not thereby impair other auxiliary aggregates which are arranged about the engine, or the structural length of the installation should not be reduced by the necessary arrangement of the other auxiliary aggregates.

The difficulties which result from the accommodation of an externally disposed exhaust gas decontamination system, i.e., of a reactor or catalyst in the engine space of a motor vehicle, are conditioned above all by the restricted space conditions prevailing thereat. If in the accommodation of the decontamination installation, the aforementioned conditions are to be fulfilled also for the accommodation of the other auxiliary aggregates, then it happens for the most part that the reactor or the catalyst have to be arranged far removed from the engine at an undesired place or possibly even outside of the engine space. Since during the operation of the installation the engine heat is to be also fully utilized, such prior art solutions for the accommodation of the installation are unsatisfactory. The present invention is therefore concerned with the task to so construct the exhaust channel connecting system between the engine and the decontamination installation that the latter can be arranged in direct proximity of the engine but sufficiently far away from other temperature-sensitive auxiliary aggregates such as starter and engine bearing supports in such a manner that the installation can extend over its entire longitudinal side in direct proximity of the engine.

The underlying problems are solved according to the present invention in that the exhaust channel adjoining the exhaust valve in the cylinder head is constructed S-shaped and its discharge aperture or orifice is disposed in the working or machining surface of the cylinder head which is constructed flange-like about the discharge aperture or orifice and is constructed for the installation of the elbow flange which is adjoined by the associated exhaust elbow which at first extends in the direction of the axis extending through the aperture or orifice and then extends toward the outside and downwardly so that the housing of the decontamination installation extending along the entire engine side may adjoin the same.

Accordingly, it is an object of the present invention to provide an exhaust gas channel and decontamination system for internal combustion engines which avoids by simple means the aforementioned shortcomings and drawbacks encountered in the prior art.

Another object of the present invention resides in an exhaust gas channel and exhaust gas decontamination installation which permits the installation of the decontamination system in proximity of the engine and with sufficient volume to assure its full effectiveness.

A further object of the present invention resides in an exhaust gas channel system which not only enables the accommodation of a decontamination installation of sufficient length and in close proximity to the engine to assure operational reliability but which also does not impair or obstruct other auxiliary aggregates of the motor vehicle.

Still a further object of the present invention resides in an exhaust gas channel system and exhaust gas purification system for motor vehicles which permit the accommodation of the purification system in the engine space notwithstanding the restricted space conditions prevailing thereat.

These and further objects, features and advantages of the present invention will become more apparent from the following description when taken in connection with the accompanying drawing which shows, for purposes of illustration only, one embodiment in accordance with the present invention, and wherein:

FIG. 1 is a front elevational view, partly in cross section, of a V-shaped reciprocating internal combustion engine in accordance with the present invention; and FIG. 2 is a side elevational view of the engine of FIG. 1.

Referring now to the drawing wherein like reference numerals are used throughout the two views to designate like parts, and more particularly to FIG. 1, essentially only those parts are illustrated in this figure which more or less are necessary for the explanation of the present invention. The V-shaped arrangement of the cylinders 1 can be clearly seen from the drawing. As a result of this arrangement also the axes of the exhaust valves 2 extend V-shaped to one another. The cylinder head surfaces 3 are therefore inclined outwardly. The machining surfaces 4 of the cylinder head 5 therefore extend in the same direction. Customarily the exhaust channel extending in the cylinder head was curved in such a manner adjoining the exhaust valve 2 that its aperture or orifice extended to and was located in the side surface 6 of the cylinder head 5. With such an arrangement of the orifice of the exhaust channel, it was not possible to accommodate the reactor along the entire length of the engine because auxiliary aggregates which were additionally arranged on the side and necessary other installations such as, on the one hand, the steering gear 7, the generator or alternator 8, the starter 9 and the air pump as well as engine supports 12 or, on the other hand, the air conditioning compressor 23, the steering gear (with right or left steered vehicles on the one or the other side), the servo pump 24 and the engine supports did not permit such an arrangement of the reactor along the entire length of the lateral engine dimension.

Consequently, the present invention proposes to construct the exhaust channel 13, which adjoins the exhaust valve 2 in the cylinder head 5, S-shaped and to permit its aperture or orifice 14 to emerge in the machining or working surface 4 of the cylinder head 5.

This arrangement of the aperture or orifice 14 entails additionally the further advantage that the aperture or orifice disposed in the working or machining surface, for example, for the hood 15, can be machined simultaneously with the machining surface 4.

The cylinder head 5 is constructed flange-like about the aperture or orifice 14 for the exhaust channel 13 and serves for the mounting of the elbow flange 16 which is adjoined by the associated exhaust elbow 17 of the installation 18. This exhaust elbow 17 extends in the section 19 illustrated in FIG. 1, at first in the direction of the axis 21 extending through the aperture or orifice 14; however, as shown in FIG. 2, it also extends forwardly and then widens downwardly in the section 22. After a deflection toward the rear, the housing of the decontamination installation 18 which extends along the entire engine side, adjoins the same which in this position is now no longer disturbed in its location by further additional aggregate installations, lines itself in proximity to the engine and does not excessively influence the aggregates disposed therebelow by heat transfer because of the larger distances.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An exhaust channel system with exhaust channel means and an exhaust gas decontamination installation which are arranged, respectively, in a cylinder head of an internal combustion engine and in a housing means, said housing means being arranged at least to one side of the internal combustion engine in direct proximity of the cylinder head and approximately parallel to the engine axis, characterized in that the exhaust channel means adjoining the exhaust valve means in the cylinder head is constructed essentially S-shaped and its aperture means is located in the working surface of the cylinder head, said working surface being constructed flange-like about the aperture means and mounted thereto an elbow flange means which is adjoined by the associated exhaust elbow means, said exhaust elbow means extending at first approximately in the direction of the axis extending through the aperture means and thereafter outwardly and downwardly so that the housing means which extends along the engine side, is able to adjoin the same.

2. An exhaust channel system according to claim 1, characterized in that the housing means extends along substantially the entire length of the engine side.

3. An exhaust channel system according to claim 2, characterized in that the engine is a V-shaped reciprocating piston engine.

4. An exhaust channel system according to claim 2, for a multi-cylinder engine, characterized in that an exhaust channel means of approximately S-shape is provided for each cylinder which terminates with its corresponding aperture means in the working surface of the cylinder head, each exhaust channel means being adjoined by an exhaust elbow means passing over into a first section of a common exhaust pipe means forming the exhaust elbow means and extending substantially in the axial direction of the engine, which thereupon is curved in a second section through about 180° to be adjoined by the housing means extending substantially in the opposite axial direction.

5. An exhaust gas channel system according to claim 4, characterized in that the second section gradually widens in the direction toward the housing means.

6. An exhaust channel system according to claim 5, characterized in that the engine is a V-shaped reciprocating piston engine.

7. An exhaust channel system according to claim 1, for a multi-cylinder engine, characterized in that an exhaust channel means of approximately S-shape is provided for each cylinder which terminates with its corresponding aperture means in the working surface of the cylinder head, each exhaust channel means being adjoined by an exhaust elbow means passing over into a first section of a common exhaust pipe means forming the exhaust elbow means and extending substantially in the axial direction of the engine, which thereupon is curved in a second section through about 180° to be adjoined by the housing means extending substantially in the opposite axial direction.

8. An exhaust gas channel system according to claim 7, characterized in that the second section gradually widens in the direction toward the housing means.

9. An exhaust channel system according to claim 8, characterized in that the engine is a V-shaped reciprocating piston engine.

* * * * *